United States Patent
Guo et al.

(10) Patent No.: US 10,476,048 B2
(45) Date of Patent: Nov. 12, 2019

(54) SECONDARY BATTERY

(71) Applicant: CONTEMPORARY AMPEREX TECHNOLOGY CO., LIMITED, Ningde, Fujian Province (CN)

(72) Inventors: Jian Guo, Ningde (CN); Quankun Li, Ningde (CN); Pinghua Deng, Ningde (CN); Peng Wang, Ningde (CN); Lingbo Zhu, Ningde (CN); Qingkui Chi, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 0 days.

(21) Appl. No.: 16/221,959

(22) Filed: Dec. 17, 2018

(65) Prior Publication Data

US 2019/0123313 A1 Apr. 25, 2019

Related U.S. Application Data

(63) Continuation-in-part of application No. 15/187,909, filed on Jun. 21, 2016, now Pat. No. 10,205,141.

(30) Foreign Application Priority Data

Mar. 17, 2016 (CN) .......................... 2016 1 0153151

(51) Int. Cl.

| H01M 2/02 | (2006.01) |
|---|---|
| H01M 2/04 | (2006.01) |
| H01M 2/06 | (2006.01) |
| H01M 10/04 | (2006.01) |
| H01M 2/12 | (2006.01) |
| H01M 2/26 | (2006.01) |
| H01M 2/30 | (2006.01) |

(52) U.S. Cl.
CPC ......... *H01M 2/0469* (2013.01); *H01M 2/028* (2013.01); *H01M 2/06* (2013.01); *H01M 2/1247* (2013.01); *H01M 2/263* (2013.01); *H01M 2/30* (2013.01); *H01M 10/0431* (2013.01); *H01M 2220/20* (2013.01)

(58) Field of Classification Search
CPC ...... H01M 2/028; H01M 2/0469; H01M 2/06; H01M 2/263; H01M 2/30; H01M 10/0431; H01M 2220/20
See application file for complete search history.

(56) References Cited

U.S. PATENT DOCUMENTS

| 10,205,141 | B2 * | 2/2019 | Guo | .................... H01M 2/0469 |
|---|---|---|---|---|
| 2009/0311593 | A1 | 12/2009 | Park | |
| 2011/0076532 | A1 | 3/2011 | Ha | |
| 2015/0340663 | A1 | 11/2015 | Minagata et al. | |
| 2016/0336574 | A1 | 11/2016 | Guen et al. | |

FOREIGN PATENT DOCUMENTS

| CN | 1755964 A | 4/2006 |
|---|---|---|
| CN | 202839828 U | 3/2013 |
| KR | 20070108748 A | 11/2007 |
| WO | 2014002647 A1 | 1/2014 |

OTHER PUBLICATIONS

First Office Action dated Aug. 31, 2017 issued in corresponding Chinese Application No. 201610153151.X.
European Search Report dated Dec. 22, 2016 issued in corresponding European Application No. 16178167.9.
Second Office Action dated Mar. 6, 2018 in corresponding Chinese Patent Application No. 201610153151.X.

* cited by examiner

*Primary Examiner* — Anca Eoff
(74) *Attorney, Agent, or Firm* — Nath, Goldberg & Meyer; Joshua B. Goldberg

(57) ABSTRACT

The secondary battery of the present invention includes: a top cover, a first electrode terminal, a second electrode terminal, an electrode-tab pad-plate, an electrode assembly, a first electrode-tab and a second electrode-tab; the first and second electrode terminal are arranged on the top cover, the electrode-tab pad-plate is a strip-plate shaped structure, and is located between the top cover and electrode assembly, the first electrode-tab includes a connecting part, a folding part and a welding part, the connecting part is beneath the electrode tab pad plate, the welding part is above the electrode tab pad plate, and the connecting part is connected with the electrode assembly, the welding part is connected with the first electrode terminal, the folding part is connected with the connecting part and welding part bypassing the electrode-tab pad-plate; the second electrode terminal is connected with the electrode assembly through the second electrode-tab.

13 Claims, 4 Drawing Sheets

SECONDARY BATTERY

CROSS-REFERENCE TO RELATED APPLICATIONS

The present application is a continuation-in-part of U.S. application Ser. No. 15/187,909, filed on Jun. 21, 2016, which claims priority to Chinese Patent Application No. 201610153151.X, filed on Mar. 17, 2016, the content of which is incorporated herein by reference in its entirety.

TECHNICAL FIELD

The present invention relates to the field of battery technologies and, particularly, to a secondary battery.

BACKGROUND

As developing of modern society and the raising of people's awareness of environmental protection, more and more new energy resources have been developed and utilized, such as wind energy, solar energy and so on. The electric energy transformed from wind energy, solar energy and so on is reserved in a battery, and used in each field of life. For example, an electric vehicle uses electric energy as the power, an energy storing power station stores electric energy, all of which usually needs a power battery with large capacity as the power supply.

A secondary battery generally includes a battery core, a metal housing used for accommodating the battery core and a battery top cover. A positive electrode tab, a negative electrode tab, a positive electrode terminal and a negative electrode terminal is arranged at top of the battery core. When assembling, weld the positive electrode tab and the negative electrode tab to the positive electrode terminal and the negative electrode terminal respectively, then put the battery core in the housing, install the battery top cover. In order to prevent the battery core from contacting the electrode terminal, a certain safe distance is provided between the battery core and the electrode terminal through an electrode tab pad plate.

In the secondary battery of the related art, the electrode tab pad plate for holding and accommodating electrodes occupies a certain space, and the components connected with the electrode tabs in the battery is connected by welding and then generates welding imprint, the welding imprint is easy to damage the electrode assembly or the electrode tab when assembling or when the electrode assembly waggling, and thus influence the battery performance.

SUMMARY

The present invention provides a secondary battery, to overcome the problem in the prior that since the part connected with the electrode tab in the battery is connected by welding, the welding imprint generated is easy to damage the electrode assembly or the electrode tab when assembling or waggling of the electrode assembly, which affects the performance of the battery.

The present invention provides a battery, includes: a top cover, a first electrode terminal, a second electrode terminal, an electrode tab pad plate, an electrode assembly, a first electrode tab and a second electrode tab; the first electrode terminal and the second electrode terminal are both arranged at the top cover;

The electrode tab pad plate is of a strip plate shaped structure, the electrode tab pad plate is located between the top cover and the electrode assembly;

The first electrode tab includes a connecting part, a folding part and a welding part, the connecting part is located at upside of the electrode tab pad plate, the welding part is located at downside of the electrode tab pad plate, the connecting part is connected with the electrode assembly, the welding part is connected with the first electrode terminal, the folding part is connected with the connecting part and the welding part bypassing the electrode tab pad plate;

The second electrode terminal is connected with the electrode assembly through the second electrode.

Further, in the above secondary battery, the electrode tab pad plate includes two pad plate end parts and a pad plate middle part; width of the pad plate middle part is less than width of the pad plate end part.

Further, in the above secondary battery, the electrode tab pad plate includes two pad plate end parts and a pad plate middle part; thickness of the pad plate end part is greater than thickness of the pad plate middle part.

Further, in the above secondary battery, the secondary battery further includes an anti-explosion valve;

The anti-explosion valve is arranged on the top cover, and an air hole corresponding to the position of the anti-explosion valve is arranged at the electrode tab pad plate.

Further, in the above secondary battery, the secondary battery further includes an anti-explosion valve;

The anti-explosion valve is arranged on the top cover, and a screen net corresponding to position of the anti-explosion valve is arranged at the electrode tab pad plate Further, in the above secondary battery, thickness of a part of the electrode tab pad plate on which the screen net is arranged is greater than thickness of the other parts.

Further, in the above secondary battery, at least one narrow lateral surface extending along an extending direction of the electrode tab pad plate is of an arc-shaped surface.

Further, in the above secondary battery, the secondary battery further includes an insulating layer;

The insulating layer is located between the top cover and the electrode tab pad plate, a first electrode terminal hole and a second electrode terminal hole are arranged on the insulating layer, the first electrode terminal hole and the first electrode terminal have corresponding position, the second electrode terminal hole and the second electrode terminal have corresponding position, the first electrode terminal is embedded into the first electrode terminal hole, the second electrode terminal is embedded into the second electrode terminal hole;

A buckle is arranged on the insulating layer, a limiting hole corresponding to position of the buckle is arranged at an edge of the electrode tab pad plate, the buckle is fastened with the limiting hole.

Further, in the above secondary battery, an embossment is arranged in the limiting hole.

Further, in the above secondary battery, the secondary battery further includes a connection plate;

The connection plate includes a first connection plate and a second connection plate;

There are at least two electrode assemblies, each electrode assembly is provided with the first electrode tab and the second electrode tab, The folding part of the first electrode tab is located at two sides of the electrode tab pad plate respectively, and the welding part of the first electrode tab is connected with the first electrode terminal through the first connection plate;

The second electrode is connected with the second electrode terminal through the second connection plate;

Further, in the above secondary battery, a viscous material is smeared on the surface of the electrode tab pad plate.

Further, in the above secondary battery, the screen net is made of a metal material or a high temperature resistant material;

The secondary battery of the present invention, through arranging the electrode tab pad plate of a strip plate shaped structure between the top cover and the electrode assembly, and the first electrode tab includes an electrode connecting part, a folding part and a welding part, the connecting part is beneath the electrode tab pad plate and the welding part is above the electrode tab pad plate, the welding part is connected with the electrode terminal, the folding part is connected with the connecting part and the welding part bypassing the electrode tab pad plate, the connecting part is connected with the electrode assembly, the first electrode terminal is arranged on the top cover, an anti-explosion valve is also arranged on the top cover, the second electrode terminal is connected with the electrode assembly through the second electrode tab, which solves the problem that since the part connected with the electrode in the battery is connected by welding, the welding imprint is easy to damage the electrode assembly or the electrode tab when assembling or waggling of the electrode assembly, influencing the battery performance, the present invention achieves the physical isolation between the welding imprint and the connecting part of the electrode tab when welding with the electrode tab, improves the battery performance, and thus extends the service life of the battery.

BRIEF DESCRIPTION OF DRAWINGS

In order to describe the technical solution of embodiments of the present invention or in the prior art more clearly, a brief description of the drawings used in the embodiments or the prior art will be provided here, obviously, the drawings described below are only some embodiments of the present invention, those skilled in the art can also get other drawings according to these drawings without creative work.

REFERENCE SIGNS

11—Top cover
12—Anti-explosion valve
13—Electrode tab pad plate
131—Air hole
132—Screen net
133—Limiting hole
14—Electrode assembly
15—Insulating layer
16—Connection plate
17—First electrode tab
171—Connecting part
172—Folding part
173—Welding part
18—Second electrode tab

DESCRIPTION OF EMBODIMENTS

In order to make the objects, technical solutions and advantages of the embodiments of the present invention more clearly, the technical solutions of the present invention will be described clearly and completely combing the drawings in the embodiments of the present invention, obviously, the above described embodiments are only part of the embodiments of the present invention, but not all of them, other embodiments obtained by those skilled in the art without any creative work are all belonging to the protection scope of the present invention.

EMBODIMENTS

Figure 1:
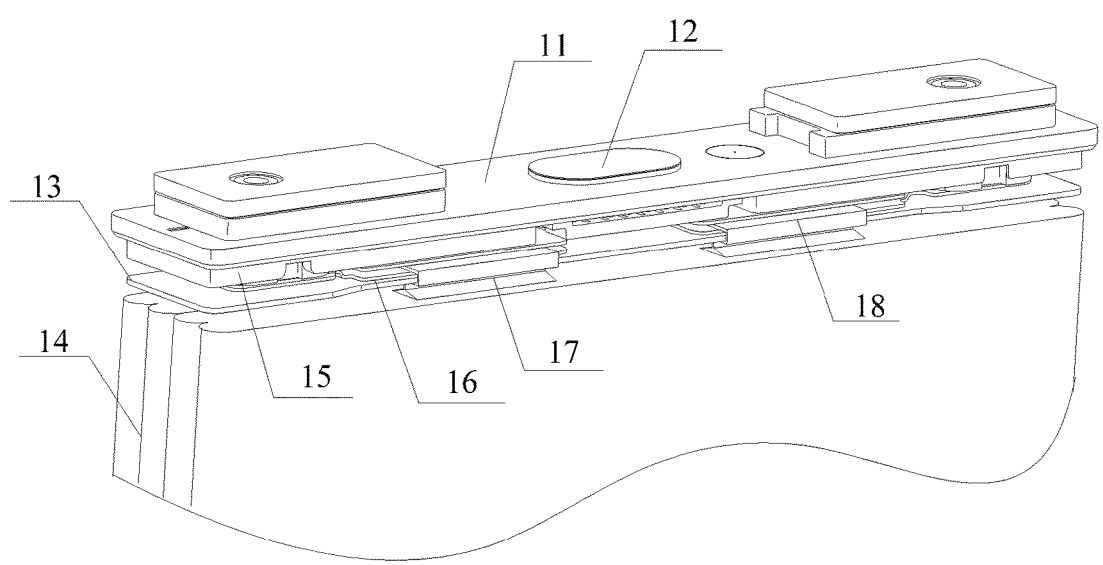
FIG. 1 is an integral structural schematic diagram of a secondary battery according to an embodiment of the present invention.
Figure 2:
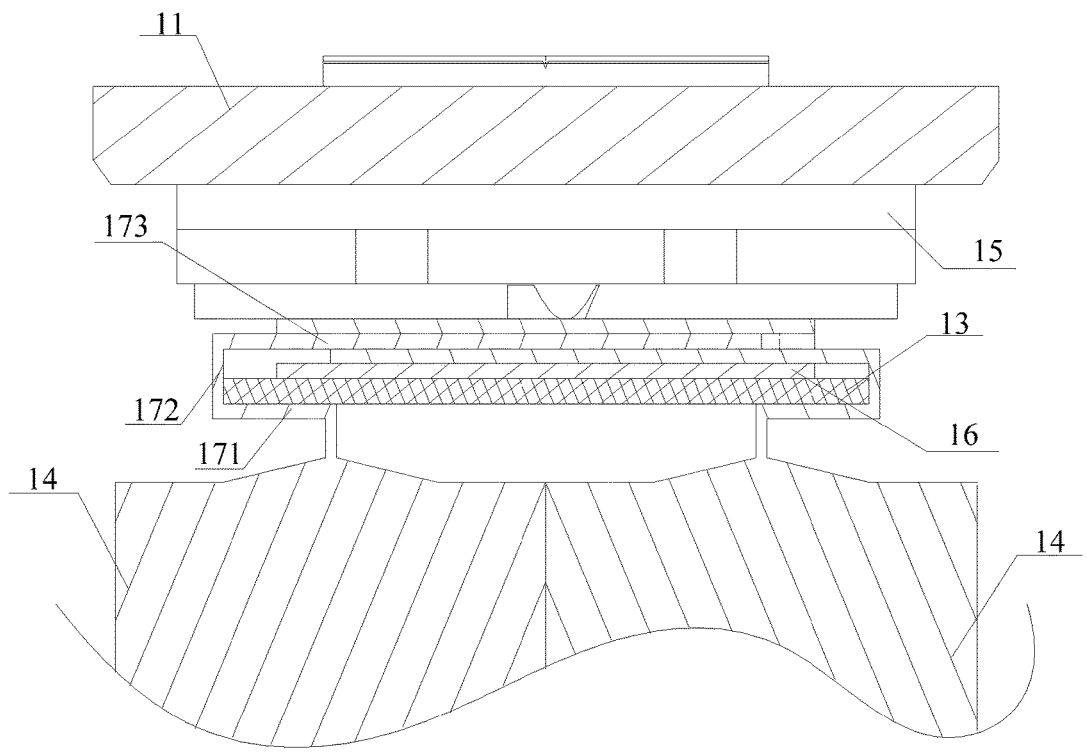
FIG. 2 is a cross sectional view of the secondary battery according to an embodiment of the present invention.

FIG. 1 is an integral structural schematic diagram of the secondary battery according to an embodiment of the present invention, FIG. 2 is a cross sectional view of the secondary battery according to an embodiment of the present invention, shown as FIG. 1 and FIG. 2, the secondary battery of the present invention can include: a top cover 11, an anti-explosion valve 12, a first electrode terminal, a second electrode terminal, an electrode tab pad plate 13, an electrode assembly 14, a first electrode tab 17 and a second electrode tab 18.

In the secondary battery, there are two electrode terminals for outputting electric energy, one is a positive electrode terminal, and the other is a negative electrode terminal. The secondary battery of the present invention includes two electrode terminals, which are a first electrode terminal and a second electrode terminal respectively, and which are both arranged on the top cover 11, the first electrode terminal can be a positive electrode terminal or a negative electrode terminal, correspondingly, the second electrode terminal can be a negative electrode terminal or a positive electrode terminal.

Since there is a large amount of chemical substance, such as electrolyte, in the secondary battery, a large number of mixed gas, liquid and so on will be generated during the charging and discharging process, correspondingly, pressure is accumulated constantly, therefore, in order to prevent the secondary battery from exploding due to excess pressure, usually an anti-explosion valve 12 is provided on the top cover 11 of the secondary battery.

In the secondary battery, the electric energy is generated through the chemical reaction between the electrode assembly 14 in the housing and the electrolyte. In the secondary battery of the related art, at least an electrode assembly 14 is provided in the housing, each electrode assembly 14 is connected with the electrode terminal through the electrode tab, so as to output the generated electric energy.

Each electrode assembly 14 is provided with a first electrode tab 17 and a second electrode tab 18, a manner of laser welding is used in the related art to connect the first electrode tab 17 with the first electrode terminal, and connect the second electrode tab 18 with the second electrode terminal. The first electrode tab 17 includes a connecting part 171, a folding part 172 and a welding part 173, the connecting part 171 is connected with the electrode assembly 14, the welding part 173 is used to welding with the first electrode terminal. In order to prevent the welding imprint generated between the welding part 173 of the first electrode and the first electrode terminal from damaging the folding part 172 and the connecting part 171, an electrode tab pad plate 13 is arranged in the secondary battery, the electrode tab pad plate 13 is of a strip plate shaped structure, and is arranged between the top cover 11 and the electrode assembly 14, so that the connecting part 171 is beneath the electrode tab pad plate and the welding part 173 is above the electrode tab pad plate 13, the folding part 172 is connected with the connecting part 171 and the welding part 173 bypassing the electrode tab pad plate 13. The connecting part 171 of the electrode and the electrode assembly 14 are protected from being easily damaged by the welding imprint. Moreover, the electrode tab can keep a certain bended shape through the supporting of the electrode tab pad plate 13.

Besides, the second electrode terminal is connected with the electrode assembly 14 through the second electrode tab 18, the connection state of the second electrode tab 18 can be same as the first electrode tab 17, and can also be different from the first electrode tab 17.

It should be noted that: there is no limit for the shape of the electrode tab pad plate 13 of the embodiment, the shape thereof will be adjusted correspondingly when applied to secondary batteries with different shapes, as long as the function and effect of the electrode tab pad plate 13 are the same.

Besides, since the first electrode tab 17 and the second electrode tab 18 are generally thin, preferably, at least one narrow lateral surface extending along the length direction of the electrode tab pad plate 13 is made into an arc-shaped surface, when assembling the secondary battery, the arrangement of each part in the housing of the secondary battery of different models or different sizes are different, hence, at least one narrow lateral surface of the electrode tab pad plate 13 can be made alternatively into an arc-shaped surface according to actual requirements. There are two narrow lateral surfaces of the electrode tab pad plate 13 with longer length, the folding part 172 of the electrode tab will contact the electrode tab pad plate 13 when bypassing the electrode tab pad plate 13, making the narrow lateral surface into an arc-shaped surface can reduce the abrasion to the first electrode tab 17 or the second electrode tab 18, thus further improving the secondary battery performance, and prolong the service life of the secondary battery.

Besides, the secondary battery of the present embodiment also includes an insulating layer 15, the insulating layer 15 is provided between the top cover 11 and the electrode tab pad plate 13, used to insulate the top cover 11 from the conductive parts in the secondary battery. A first electrode terminal hole and a second electrode terminal hole are provided at the insulating layer 15, the first electrode terminal hole is corresponding to the location of the first electrode terminal, the second electrode terminal hole is corresponding to the location of the second electrode terminal, the first electrode terminal is embedded into the first electrode terminal hole, the second electrode terminal is embedded into the second electrode terminal hole, which achieves the effect of insulating to the electrode terminals.

In order to achieve the better assembling effect between the electrode tab pad plate 13 and the insulating layer 15, a buckle is provided at the insulating layer 15, a limiting hole 133 relative to the buckle location is provided on the edge of the electrode tab pad plate 13, as shown in FIG. 3, FIG. 4, FIG. 6 and FIG. 7, the buckle is fastened with the limiting hole 133. Thus, the relative location relationship between the electrode tab pad plate 13 and the insulating layer 15 is maintained after assembling, which improves the stability of the secondary battery during assembling.

Preferably, an embossment is arranged in the limiting hole 133. It is achieved that the assembling effect of the secondary battery is further improved.

A viscous material can be coated on the surface of the electrode tab pad plate 13, so that the relative position between the electrode tab pad plate 13 and the insulating layer 15 is fixed through the viscous material. The stability of the secondary battery can also be improved during assembling.

When there are multiple electrode assemblies 14 in the secondary battery or the first electrode tab 17 is shorter, a connection plate 16 is used in the assembling process, the connection plate includes a first connection plate and a second connection plate. For example, there are at least two electrode assemblies 14, two first electrode tabs 17 and two second electrode tabs 18, each electrode assembly 14 is provided with the first electrode tab 17 and the second electrode tab 18. When there are at least two first electrode tabs 17 and two second electrode tabs 18, they can be winded at two sides of the electrode tab pad plate 13, such as, the folding parts 172 of the first electrode tab 17 are provided at two sides of the electrode tab pad plate 13 respectively, the welding part 173 of the first electrode tab 17 is connected to the electrode terminal through the first connection plate. The second electrode tab 18 is connected to the second electrode terminal through the second connection plate. The electrode tab pad plate 13 is bonded with the first connection plate through the viscous material. It is achieved that the ordering effect of the assemblies in the secondary battery is improved.

Figure 3:
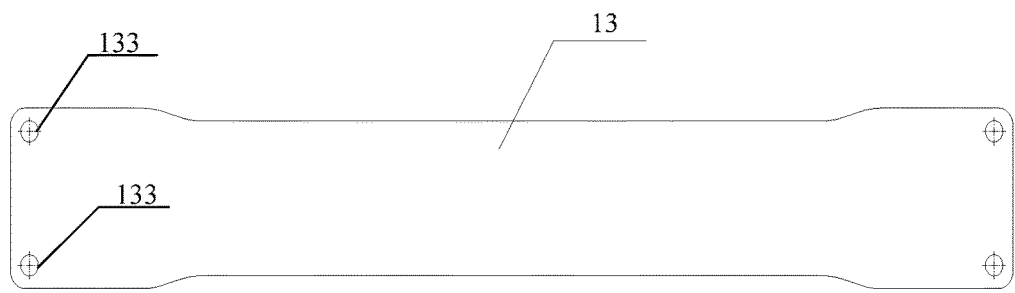
FIG. 3 is a first top view of an electrode tab pad plate the secondary battery according to an embodiment of the present invention.

In order to make the gas generated during the using process pass the electrode tab pad plate 13 more smoothly, such as the gas generated during the charging and discharging process can pass the electrode tab pad plate 13 easily, the electrode tab pad plate 13 can be made into a special shape, FIG. 3 is a first top view of the electrode tab pad plate of the secondary battery according to an embodiment of the present invention, as shown in FIG. 3, the electrode tab pad plate 13 includes two pad plate end parts and a pad plate middle part, the width of the pad plate middle part is less than the width of the pad plate end part, the shape thereof is similar to a dumbbell. It is achieved that a gap exists between the electrode tab pad plate 13 and the housing pad plate of the secondary battery after assembling, which is convenient for the gas generated in the secondary battery to pass smoothly.

Figure 5:
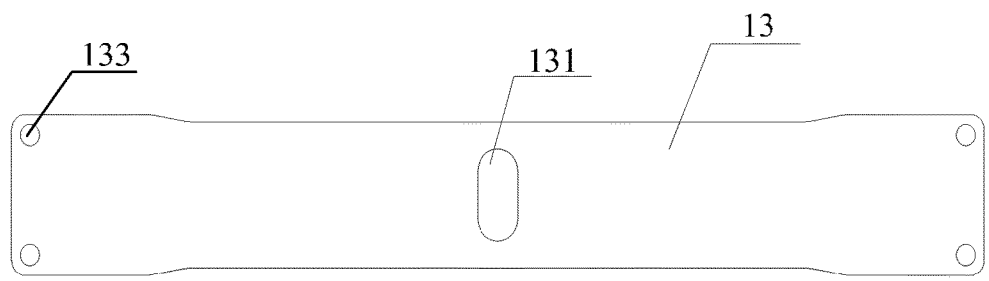
FIG. 5 is a second top view of the electrode tab pad plate of the secondary battery according to an embodiment of the present invention.

FIG. 5 is a second top view of the electrode tab pad plate of the secondary battery according to an embodiment of the present invention, as shown in FIG. 5, an air hole 131 corresponding to the position of the anti-explosion valve 12 is arranged on the electrode tab pad plate 13, since the air hole 131 is corresponding to the position of the anti-explosion valve 12, so that the gas generated in the secondary battery can reach the anti-explosion valve 12 easily, reducing the dangerous risk.

It should be noted that: the number of the air hole 13 can be one or multiple, the shape of the air hole 13 can be of a circular shape or ellipse shape, preferably, the opening area of the air hole 131 accounts for 30%~80% of the area of the anti-explosion valve 12.

Figure 4:
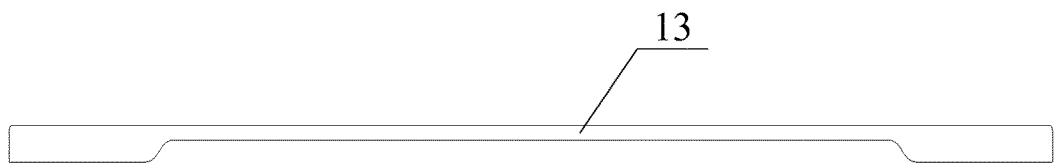
FIG. 4 is a first front view of the electrode tab pad plate of the secondary battery according to an embodiment of the present invention.

After assembling of the secondary battery, the electrode assembly 14 in the secondary battery is easy to waggle during using. For example, during the using process of the secondary battery applied in the electric vehicle, the electrode assembly 14 of the secondary battery is easy to waggle due to the waggle occurred during the driving process of vehicle. FIG. 4 is a first front view of the electrode tab pad plate of an embodiment of the present invention, as shown in FIG. 4, in order to solve the problem, the thickness of the pad plate end part of the electrode tab pad plate 13 can be larger than the thickness of the pad plate middle part. The function is that: the part with increased thickness has the effect of limiting the electrode assembly 14, which decreases the waggle of the electrode assembly 14 in the secondary battery.

Figure 6:
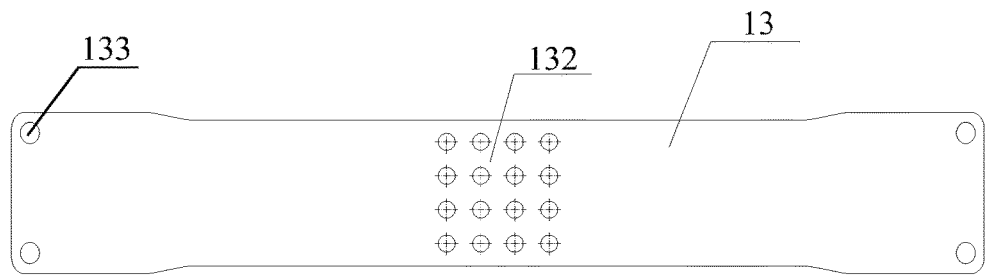
FIG. 6 is a third top view of the electrode tab pad plate of the secondary battery according to an embodiment of the present invention.

There is some spark generated together with a large amount of mixed gas and liquid during the charging and discharging process, in order to prevent the spark from ejecting, a metal plate is welded under the top cover 11 to achieve resistant in the related art. FIG. 6 is a third top view of the electrode tab pad plate of the secondary battery according to an embodiment of the present invention, as shown in FIG. 6, in order to achieve better resistant effect, a screen net 132 corresponding to the position of the anti-explosion valve 12 is arranged at the electrode tab pad plate 13. The first filtration of the gas generated in the secondary battery is achieved through the screen net 132, which achieves the effect of passing the gas and meanwhile preventing the spark.

The screen net 132 can be made of multiple shapes such as waist-shape hole, triangle-shape hole, circle-shape hole, square-shape hole and so on, the multiple holes can be arranged in a certain regulation, to form a gas channel, preferably, multiple waist-shape holes or multiple circle-shape holes are adopted, for example, the screen net 132 can be made of multiple waist-shape holes with 1 mm length and 0.5 mm width in a manner of uniform arrangement or can be made of multiple circle-shape holes with diameter less than 4 mm in a manner of uniform arrangement. Preferably, the sum of the opening area of each hole of the screen net accounts for 30%-80% of the area of the anti-explosion valve 12. The effect of arranging the screen net 132 lies in that: when the heat of the secondary battery is out of control, the gas passing effect can be guaranteed, at the same time, the high temperature solid particles can be prevented from passing the screen net 132, thus preventing the flammable high temperature solid particles from ejecting outside the anti-explosion valve 12 and mixing and firing with air, so as to significantly improve the safety performance of the battery.

Figure 7:
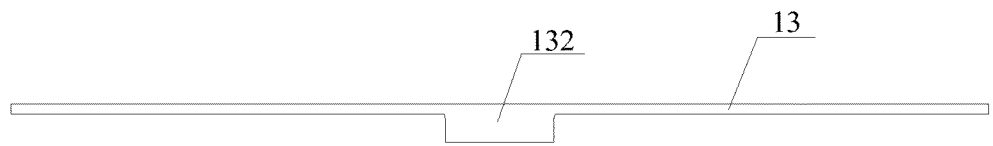
FIG. 7 is a second front view of the electrode tab pad plate of the secondary battery according to an embodiment of the present invention.

Preferably, the part of the electrode tab pad plate 13 on which the screen net 132 is arranged is thicker than the other parts. FIG. 7 is a second front view of the electrode tab pad plate of the secondary battery according to an embodiment of the present invention, as shown in FIG. 7, because the temperature of the gas in the secondary battery is relatively high, in order to enhance the effect of spark preventing, and make the electrode tab pad plate difficult to deform, the screen net 132 can be made thicker, improving the effect of spark preventing.

Preferably, the screen net 132 is made of metal material or high temperature resistant material, so as to sufficiently reduce the damage to the screen net 132 caused by the high temperature spark and gas, and extend the service life of the electrode tab pad plate 13.

The secondary battery of the present embodiment, through arranging the electrode tab pad plate 13 of a strip shaped structure between the top cover 11 and the electrode assembly 14, and the first electrode tab 17 includes an electrode connecting part 171, a folding part 172 and a welding part 173, the connecting part 171 is beneath the electrode tab pad plate and the welding part 173 is above the electrode tab pad plate 13, the welding part 173 is connected with the electrode terminal, the folding part 172 is connected with the connecting part 171 and the welding part 173 bypassing the electrode tab pad plate 13, the connecting part 171 is connected with the electrode assembly 14, the first electrode terminal is arranged on the top cover 11, an anti-explosion valve 12 is also arranged on the top cover 11, the second electrode terminal is connected with the electrode assembly 14 through the second electrode tab 18, which solves the problem that since the part connected with the electrode tab in the battery is connected by welding, the welding imprint is easy to damage the electrode assembly or the electrode tab when assembling or waggling of the electrode assembly, influencing the battery performance, the present invention achieves the physical isolation between the welding imprint and the connecting part of the electrode tab when welding with the electrode tab, improves the battery performance, and thus extends the service life of the battery.

Finally, it should be noted that: the above embodiments are only used to describe the technical solutions of the present invention, rather than limiting them; although the present invention is described in detail referring to the above-mentioned embodiments, those skills in the art should understand that: they can still modify the technical solutions in the embodiments, or make any equivalent replacements to part or all the technical features; however, those modifications or replacements do not make the essence of the corresponding technical solutions depart from the scope of the technical solutions of the embodiments of the present invention.

What is claimed is:

1. A secondary battery, comprising: a top cover, a first electrode terminal, a second electrode terminal, an electrode tab pad plate, an electrode assembly, a first electrode tab and a second electrode tab; the first electrode terminal and the second electrode terminal are both arranged at the top cover;

the electrode tab pad plate is located between the top cover and the electrode assembly;

the first electrode tab comprises a connecting part, a folding part and a welding part, the connecting part is beneath the electrode tab pad plate, the welding part is above the electrode tab pad plate, the connecting part is connected with the electrode assembly, the welding part is connected with the first electrode terminal, the folding part is connected between the connecting part and the welding part and bypasses the electrode tab pad plate;

the second electrode terminal is connected with the electrode assembly through the second electrode tab; and a viscous material is coated on an upper surface of the electrode tab pad plate, wherein the secondary battery further comprises a first connection plate and a second connection plate, the first electrode tab is connected with the first electrode terminal through the first connecting plate, and the second electrode tab is connected with the second electrode terminal through the second connecting plate; and the electrode tab pad plate is bonded with the first connection plate through the viscous material.

2. The secondary battery according to claim 1, wherein the electrode tab pad plate comprises two pad plate end parts and a pad plate middle part; width of the pad plate middle part is less than width of the pad plate end part.

3. The secondary battery according to claim 2, wherein the secondary battery further comprises an anti-explosion valve,
the anti-explosion valve is arranged on the top cover, and a screen net corresponding to position of the anti-explosion valve is arranged at the electrode tab pad plate.

4. The secondary battery according to claim 3, wherein thickness of a part of the electrode tab pad plate on which the screen net is arranged is greater than thickness of the other parts.

5. The secondary battery according to claim 3, wherein the screen net is made of a metal material or a high temperature resistant material.

6. The secondary battery according to claim 1, wherein the electrode tab pad plate comprises two pad plate end parts and a pad plate middle part; thickness of the pad plate end part is greater than thickness of the pad plate middle part.

7. The secondary battery according to claim 1, wherein the secondary battery further comprises an anti-explosion valve;
the anti-explosion valve is arranged on the top cover, and an air hole corresponding to position of the anti-explosion valve is arranged at the electrode tab pad plate.

8. The secondary battery according to claim 1, wherein at least one narrow lateral surface extending along an extending direction of the electrode tab pad plate is of an arc-shaped surface.

9. The secondary battery according to claim 1, wherein the secondary battery further comprises an insulating layer; the insulating layer is located between the top cover and the electrode tab pad plate, a first electrode terminal hole and a second electrode terminal hole are arranged on the insulating layer, the first electrode terminal hole and the first electrode terminal have corresponding position, the second electrode terminal hole and the second electrode terminal have corresponding position.

10. The secondary battery according to claim 9, wherein the first electrode terminal is embedded into the first electrode terminal hole, the second electrode terminal is embedded into the second electrode terminal hole.

11. The secondary battery according to claim 1, wherein a buckle is arranged on the insulating layer, a limiting hole corresponding to position of the buckle is arranged at an edge of the electrode tab pad plate, the buckle is fastened with the limiting hole.

12. The secondary battery according to claim 11, wherein an embossment is arranged in the limiting hole.

13. The secondary battery according to claim 1, wherein the secondary battery further comprises
at least two electrode assemblies, each of the at least two electrode assemblies is provided with the first electrode tab and the second electrode tab,
the folding parts of the first electrode tabs of the at least two electrode assemblies are located at two sides of the electrode tab pad plate respectively, and the welding parts of the first electrode tabs of the at least two electrode assemblies are connected with the first electrode terminal through the first connection plate,
the second electrode tabs of the at least two electrode assemblies are connected with the second electrode terminal through the second connection plate.

* * * * *